(12) United States Patent
Cursetjee (10) Patent No.: US 9,631,825 B2
(45) Date of Patent: Apr. 25, 2017

(54) AIR FILTER ASSEMBLY

(71) Applicant: Nortek Air Solutions, LLC, Eden Prairie, MN (US)

(72) Inventor: Zareer Cursetjee, Happy Valley, OR (US)

(73) Assignee: Nortek Air Solutions, LLC, Eden Prairie, MN (US)

( * ) Notice: Subject to any disclaimer, the term of this patent is extended or adjusted under 35 U.S.C. 154(b) by 992 days.

(21) Appl. No.: 13/717,826

(22) Filed: Dec. 18, 2012

(65) Prior Publication Data

US 2014/0170958 A1 Jun. 19, 2014

(51) Int. Cl.
*F24F 3/16* (2006.01)
*F24F 13/28* (2006.01)
*B01D 46/00* (2006.01)

(52) U.S. Cl.
CPC ........ *F24F 3/1603* (2013.01); *B01D 46/0047* (2013.01); *F24F 13/28* (2013.01); *B01D 46/002* (2013.01); *B01D 46/0023* (2013.01); *F24F 2221/14* (2013.01)

(58) Field of Classification Search
CPC .......... F24F 13/28; F24F 3/1603; F24F 13/10; F24F 2221/14; B01D 46/002; B01D 46/0023; B01D 46/0047
USPC .................. 454/292, 254, 333, 338, 292.333
See application file for complete search history.

(56) References Cited

U.S. PATENT DOCUMENTS

| | | | |
|---|---|---|---|
| 1,426,196 A * | 8/1922 | Jordahl | ............... 55/483 |
| 2,347,334 A * | 4/1944 | Schmieg | ........ B24B 55/06 126/299 R |
| 4,061,082 A | 12/1977 | Shuler | |
| 4,265,643 A | 5/1981 | Dawson | |
| 4,547,208 A | 10/1985 | Oace | |
| 4,749,390 A | 6/1988 | Burnett | |
| 5,139,546 A | 8/1992 | Novobilski | |
| 5,192,348 A | 3/1993 | Ludwig | |
| 5,207,614 A | 5/1993 | Passadore | |

(Continued)

FOREIGN PATENT DOCUMENTS

| EP | 1391231 A1 | 2/2004 |
|---|---|---|
| KR | 10-0689934 B1 | 3/2007 |
| WO | WO-2014/099304 A1 | 6/2014 |

OTHER PUBLICATIONS

"International Application Serial No. PCT/US2013/075434, International Search Report mailed Mar. 25, 2014", 3 pgs.

(Continued)

*Primary Examiner* — Gregory Huson
*Assistant Examiner* — Dana Tighe
(74) *Attorney, Agent, or Firm* — Schwegman Lundberg & Woessner, P.A.

(57) ABSTRACT

An air filter assembly is configured to deliver filtered air to a room. The assembly may include a main housing having at least first and second surfaces, wherein the first surface differs from the second surface, one or more first air filters proximate to the first surface, wherein the one or more first air filters is configured to discharge a first portion of filtered air through the first surface in a direct direction, and one or more second air filters proximate to the second surface. The one or more second air filters is configured to discharge a second portion of filtered air through the second surface in a second direction that differs from the first direction.

20 Claims, 7 Drawing Sheets

(56) References Cited

U.S. PATENT DOCUMENTS

| | | | |
|---|---|---|---|
| 5,295,902 A | 3/1994 | Hock | |
| 5,318,474 A * | 6/1994 | Klassen | F24F 13/068 454/296 |
| 5,518,451 A | 5/1996 | Renz | |
| 5,613,991 A | 3/1997 | Esaki | |
| 5,620,369 A | 4/1997 | Spransy | |
| 5,733,348 A * | 3/1998 | Skarsten | 55/385.2 |
| 5,850,183 A * | 12/1998 | Berry, III | 340/607 |
| 5,961,702 A | 10/1999 | Doneit | |
| 6,050,774 A | 4/2000 | LeBaron | |
| 6,168,517 B1 * | 1/2001 | Cook | F24F 7/007 454/269 |
| 6,332,308 B1 | 12/2001 | Miller | |
| 6,471,738 B1 * | 10/2002 | Thompson | B01D 46/24 454/294 |
| 7,048,500 B2 | 5/2006 | Cuvelier | |
| 7,083,659 B1 | 8/2006 | Joyce et al. | |
| 7,331,854 B2 * | 2/2008 | Fleming et al. | 454/292 |
| 7,527,468 B2 | 5/2009 | Hopkins | |
| 7,597,534 B2 | 10/2009 | Hopkins | |
| 7,914,252 B2 | 3/2011 | Hopkins | |
| 7,922,442 B2 | 4/2011 | Hopkins | |
| 8,087,877 B2 | 1/2012 | Hopkins | |
| 2003/0045226 A1 | 3/2003 | Yokoyama | |
| 2003/0050004 A1 | 3/2003 | Schottler | |
| 2005/0115213 A1 | 6/2005 | Lim | |
| 2008/0210000 A1 | 9/2008 | Yoshitome | |
| 2009/0221226 A1 | 9/2009 | Gebke | |
| 2009/0229685 A1 | 9/2009 | Hageman | |
| 2010/0112926 A1 | 5/2010 | Ozeki | |
| 2011/0014061 A1 | 1/2011 | Hopkins et al. | |
| 2011/0097986 A1 | 4/2011 | Cursetjee et al. | |
| 2011/0100221 A1 | 5/2011 | Wu | |
| 2011/0255704 A1 | 10/2011 | Hopkins | |
| 2012/0174612 A1 | 7/2012 | Madara et al. | |
| 2012/0190287 A1 | 7/2012 | Ghattas | |

OTHER PUBLICATIONS

"International Application Serial No. PCT/US2013/075434, Written Opinion mailed Mar. 25, 2014", 9 pgs.

"European Application Serial No. 13864053.7, Extended European Search Report mailed Sep. 5, 2016", 7 pgs.

"European Application Serial No. 13864053.7, Office Action mailed Oct. 26, 2015", 2 pgs.

"European Application Serial No. 13864053.7, Response filed Mar. 23, 2016 to Office Action mailed Oct. 26, 2015", 8 pgs.

\* cited by examiner

FIG. 11

# AIR FILTER ASSEMBLY

BACKGROUND OF THE DISCLOSURE

Embodiments of the present disclosure generally relate to a system and method for delivering filtered air within a clean environment, and, more particularly, to a multi-directional air filter assembly configured to deliver air into a clean environment in multiple directions.

Certain interior environments, such as clean rooms, hospital-like operating rooms, radiology rooms, and dental suites, utilize extremely clean air in order to protect target sites and work therein. Such rooms may also have disparate heating or cooling needs at different points in the room. For instance, electronic equipment may produce excess heat, and require cool air to be concentrated in a particular vicinity.

In modern operating rooms, for example, equipment such as robotic surgical aids may be used. The surgical aids typically make surgery more precise and less prone to errors caused by the inherent fallibility of human hands. Additionally, even in typical clean environments, there may be a significant need for overhead-supported equipment, such as light boom assemblies, automated material handling systems, and the like. Typically, such equipment is hung from the building structure and descends through the ceiling in order to preserve valuable floor space.

Ventilation equipment may be positioned within the ceiling and configured to direct air flow over the environment. For example, a filtering module may be secured to a ceiling, underneath a plenum. The filtering module is configured to receive air from the plenum, filter the air, and direct the filtered air downward toward the floor. The filtered air typically passes into exhaust vents proximate the floor, and is recirculated back up to the plenum by way of fans, for example. As such, the air may be continually filtered and circulated.

Instead of being positioned underneath an air plenum proximate a ceiling of a room, the filtering module may be secured to a vertical wall of the room. The filtering module receives air through ductwork or a plenum proximate the wall. The filtering module filters received air and discharges the filtered air into the room.

Whether the filtering module is secured to a ceiling or wall of a room, the filtering module typically discharges filtered air in one direction, such as toward the floor or a center of the room. However, in various settings, equipment positioned at or secured to other portions of the walls or the ceiling may benefit from filtered air. Typical, unidirectional filtering modules are unable to direct discharged air toward a primary target location (such as an operating table) and the equipment at other locations.

SUMMARY OF THE DISCLOSURE

Certain embodiments of the present disclosure provide an air filter assembly configured to deliver filtered air to a room. The air filter assembly may include a main housing having at least first and second surfaces, wherein the first surface differs from the second surface. One or more first air filters may be proximate to the first surface. The first air filter(s) is configured to discharge a first portion of filtered air through the first surface in a first direction. One or more second air filters may be proximate to the second surface. The second air filter(s) may be configured to discharge a second portion of filtered air through the second surface in a second direction that differs from the first direction. In an embodiment, the first surface may include a bottom surface, and the second surface may include one or both of one or more lateral surfaces or one or more end surfaces. The first surface may be orthogonal to the second surface.

The air filter assembly may also include a third surface that differs from the first and second surfaces, and one or more third air filters proximate to the third surface. The third air filter(s) is configured to discharge a third portion of filtered air through the third surface in a third direction that differs from the first and second directions. In an embodiment, the first surface includes a bottom surface, the second surface includes one or more lateral surfaces, and the third surface includes one or more end surfaces.

The main housing may be formed in various shapes and sizes. For example, the main housing may be box-shaped or dome-shaped. The main housing may be configured to be secured underneath a ceiling of the room. Alternatively, the main housing may be configured to be secured to a wall of the room.

Each of the air filters may include a filtering medium configured to filter contaminants from the air, and an air-regulating device secured to the filtering medium. The air-regulating device may be configured to be selectively opened and closed. The air-regulating device may include one or more of a damper or an equalizer.

Certain embodiments of the present disclosure provide a system for supplying filtered air to a room. The system may include a plenum positioned about at least a portion of the room, and an air filter assembly in fluid communication with the plenum. The air filter assembly is configured to receive and filter air from the plenum and deliver filtered air to the room.

Certain embodiments of the present disclosure provide a method of supplying filtered air to a room. The method may include moving air into an air filter assembly positioned within a room, filtering a first portion of the air with one or more first air filters proximate to a first surface of the filter assembly, filtering a second portion of the air with one or more second air filters proximate to a second surface of the air filter assembly that differs from the first surface, and discharging filtered air through the first and second surfaces of the air filter assembly into the room. The method may also include filtering a third portion of the air with one or more third air filters proximate to a third surface of the air filter assembly, wherein the third surface differs from the first and second surfaces, and discharging filtered air through the third surface of the air filter assembly.

Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Figure 1:
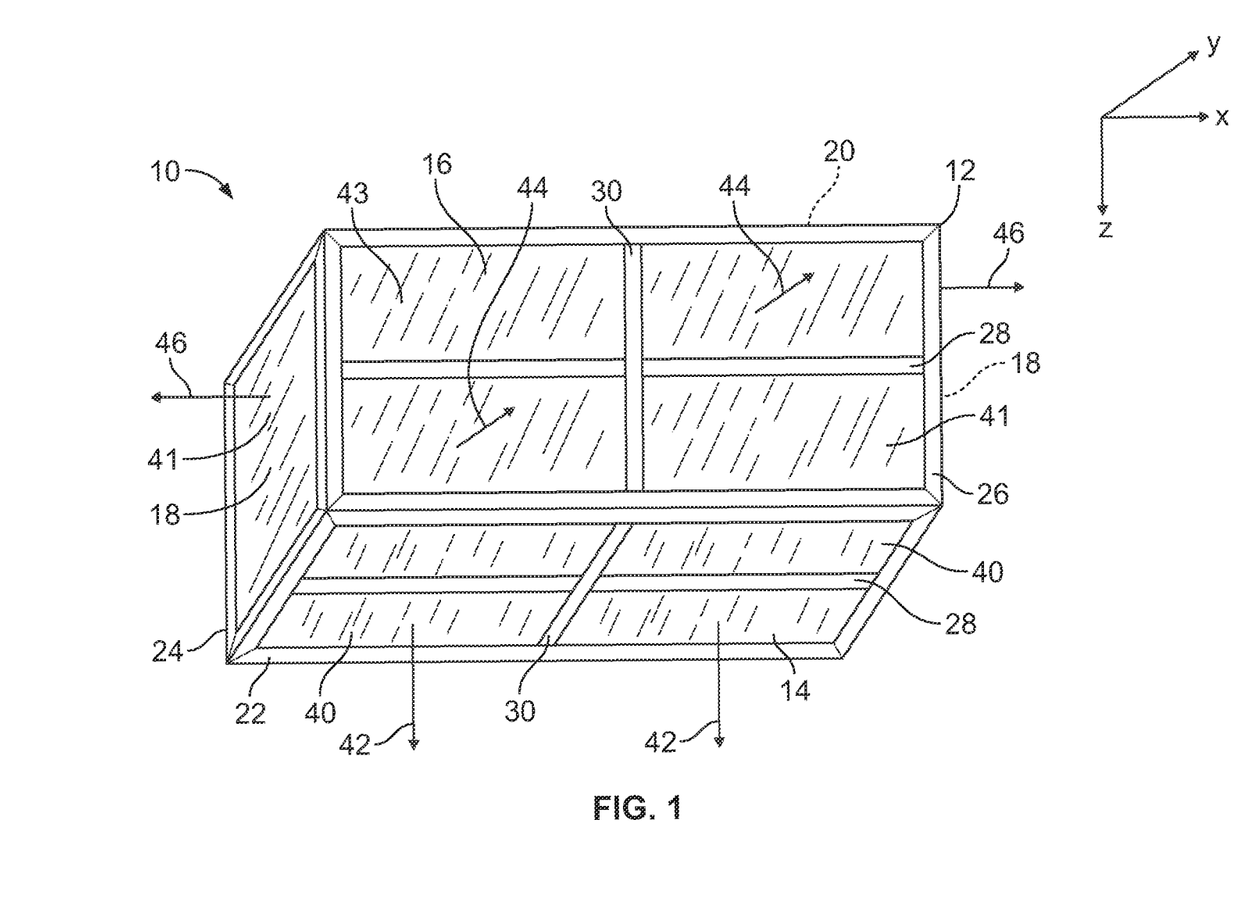
FIG. 1 illustrates an isometric view of a multi-directional air filter assembly, according to an embodiment of the present disclosure.

FIG. 1 illustrates an isometric view of a multi-directional air filter assembly 10, according to an embodiment of the present disclosure. The assembly 10 includes a main housing 12 having a bottom surface 14 connected to opposed lateral surfaces 16 and opposed end surfaces 18. The surfaces 14, 16, and 18 are within different planes. That is, the surfaces 14, 16, and 18 are not coplanar. The bottom, lateral, and end surfaces 14, 16, and 18, respectively, define an internal chamber (hidden from view in FIG. 1). A top 20 of the main housing 12 may be open and configured to receive air that passes into the internal chamber.

The bottom surface 14 includes a frame 22 that connects to frames 24 and 26 of the end and lateral surfaces 18 and 16, respectively. The frames 22, 24, and 26 may be formed of metal, such as stainless steel, or plastic, and provide rigid structures that define the bottom, lateral, and end surfaces 14, 16, and 18. Each frame 22, 24, and 26 may include internal beams 28 and 30 configured to provide structural support to the frames 22, 24, and 26. The beams 28 may extend about longitudinal central axes of the frames 22, 24, and 26, while the beams 30 may extend about lateral central axes of the frames 22, 24, and 26. Accordingly, the beams 28 and 30 may be cross-beams that intersect proximate to a center of a surface. The frames 22, 24, and 26, including the beams 28 and 30, may be configured to support various structural components, such as light fixtures, sprinkler heads, electrical outlets, and/or the like.

One or more air filters 40 are secured proximate to the bottom surface 14. For example, the air filters 40 are secured to an internal surface of the bottom surface 14. Additionally, one more air filters 41 may be proximate to one or both end surfaces 18. For example, the air filters 41 may be secured to internal surfaces of the end surfaces 18. Further, one or more air filters 43 may be secured proximate to one or both lateral surfaces 16. For example, the air filters 43 may be secured proximate to one or both lateral surfaces 16. As shown, the bottom surface 14 may support four air filters 40. Similarly, the lateral surfaces 16 may support four air filters 43, while the end surfaces 18 may each support an air filter 41. However, more or less air filters 40, 41, and 43 than those shown may be used. For example, the lateral surfaces 16 may support one air filter 43, while the end surfaces 18 support two or more filters 41. Additionally, not all surfaces of the assembly 10 may support air filters 40, 41, and/or 43. For example, only one end surface 18 may support air filters 41, and only one lateral surface 16 may support air filters 43.

The air filters 40, 41, and 43 may all be of similar construction and configured to filter contaminants, debris, and the like from air. Each filter 40, 41, 43 may include fiberglass filtering medium, for example.

In operation, the assembly 10 is configured to discharge filtered air in multiple directions. As shown, filtered air is discharged through the air filters 40 of the bottom surface 14 in the direction of arrows 42 in a vertical direction (parallel to the z-axis). At the same time, filtered air may be discharged through the air filters 43 of the lateral surfaces 16 in the directions of arrows 44 parallel to a y-axis that is orthogonal to the z-axis. Further, filtered air may be discharged through the air filter(s) 41 of the end surfaces 18 in the directions of arrows 46 parallel to an x-axis is orthogonal to the y- and z-axes. Thus, the assembly 10 is configured to discharge filtered air in multiple directions that differ from one another. For example, the direction 42, which is parallel to the z-axis, differs from the directions 44 and 46, which are parallel to the y- and x-axes, respectively. Accordingly, the assembly 10 may supply filtered air directly to multiple components at various areas within a room. The assembly 10 is configured to discharge filtered air in a vertical direction (for example, toward a floor of a room), as well as lateral directions (for example, toward one or more walls of a room).

Figure 2:
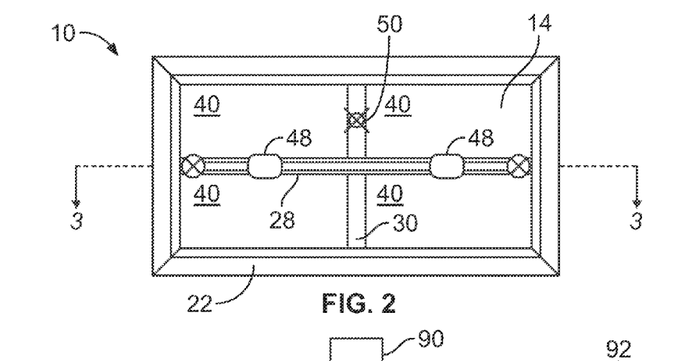
FIG. 2 illustrates a bottom plan view of a multi-directional air filter assembly, according to an embodiment of the present disclosure.

FIG. 2 illustrates a bottom plan view of the multi-directional air filter assembly 10. The beam 28 may support one or more light fixtures 48, while the beam 30 may support a sprinkler head 50. More or less light fixtures 48 may be supported by the beam 28. Alternatively, the beam 28 may support the sprinkler head 50, while the beam 30 supports the light fixtures 48. Additionally, the frame 22, including the beams 28 and 30, may support various other components, such as electrical outlets, ceiling fans, boom assemblies, and the like. Further, the frame 22, including the beams 28 and 30, may be devoid of the light fixtures 48 and the sprinkler head 50.

Figure 3:
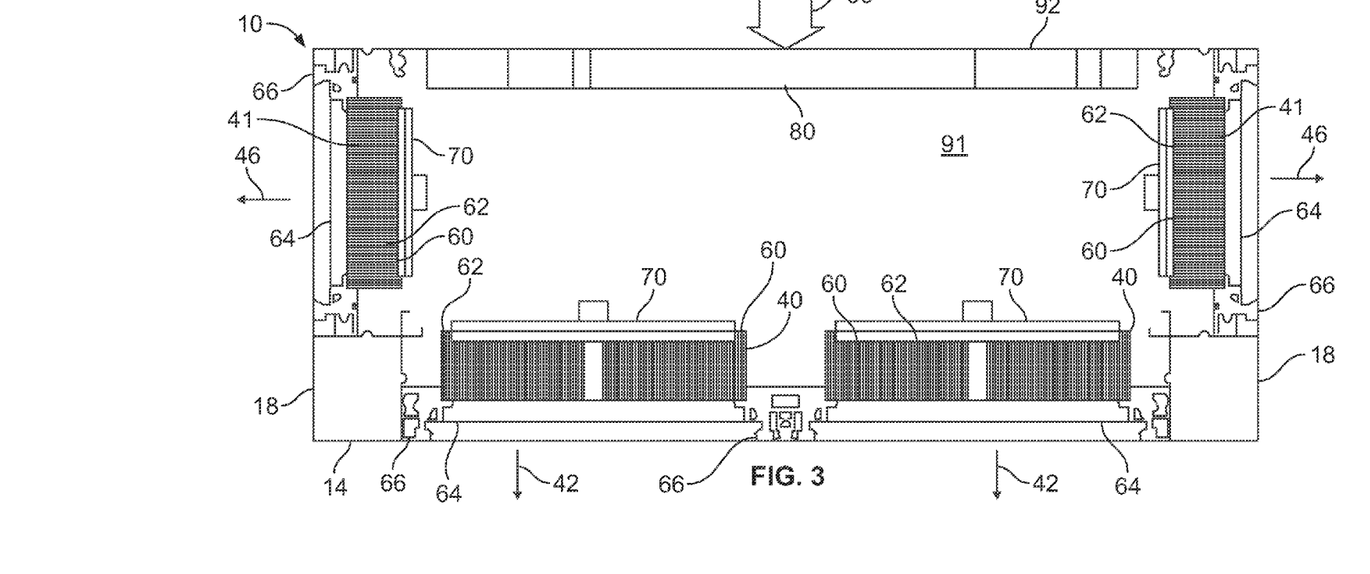
FIG. 3 illustrates an internal cross-sectional view of a multi-directional air filter assembly through line 3-3 of FIG. 2, according to an embodiment of the present disclosure.

FIG. 3 illustrates an internal cross-sectional view of the multi-directional air filter assembly 10 through line 3-3 of FIG. 2. The air filters 40, 41, and 43 (the air filters 43 are not shown in FIG. 4) may each include a main body 60 that contains filtering medium 62. Each main body 60 securely connects to a surface, such as the bottom surface 14 or the end surfaces 18, through one or more brackets 64 that secure to a frame, such as the frame 22, through fastener members 66, such as bushings, bolts, screws, and/or the like.

Additionally, each air filter 40, 41, and 43 may include an air-regulating device 70 secured over the filtering medium 62 opposite from the bracket 64. The air-regulating device 70 may be configured to selectively allow air to pass into the filtering medium 62. For example, the air-regulating device 70 may be a damper, equalizer, diffuser, and/or the like.

The assembly 10 also includes a structural connection member 80, such as a beam, frame, or the like, that is configured to allow the assembly 10 to be secured to a structure, such as a ceiling or wall proximate a plenum, duct, air conduit, or the like. The structural connection member 80 may be secured to the structure through fasteners, brackets, and/or the like.

In operation, air 90 passes into the internal chamber 91 of the assembly 10 through an open end 92. The air 90 is moved into the internal chamber 91 through an air delivery device (not shown in FIG. 3), such as one or more fans, an air handler or air handling system, and/or the like. Optionally, one or more fans may be secured within the internal chamber 91. The air 90 is then filtered by the air filters 40, 41, and 43 and discharged in the directions of arrows 42, 44, and 46, as shown in FIG. 1, in particular.

Figure 4:
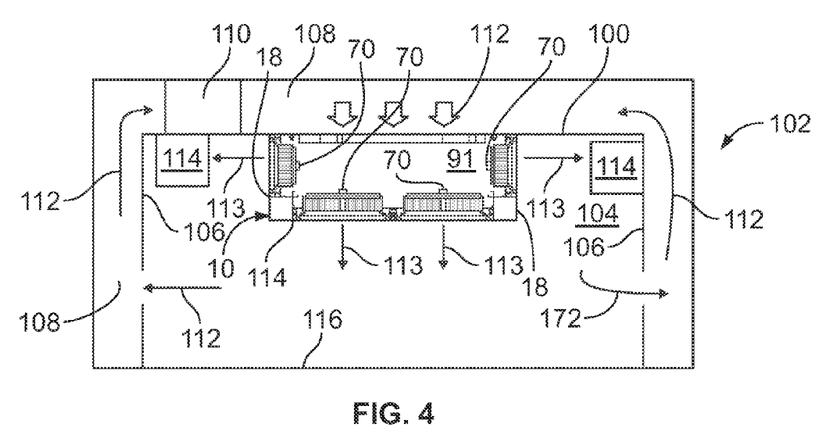
FIG. 4 illustrates a simplified view of a multi-directional air filter assembly secured to a ceiling of a room, according to an embodiment of the present disclosure.

FIG. 4 illustrates a simplified view of the multi-directional air filter assembly 10 secured to a ceiling 100 of a room 102, according to an embodiment of the present disclosure. FIG. 4 illustrates a system of supplying filtered air to the room 102. The assembly 10 and the room 102 are not necessarily drawn to scale. Each of the assembly 10 and the room 102 may be smaller or larger than shown. Additionally, multiple assemblies 10 may be secured within the room 102.

The room 102 includes a main space 104, such as a clean room environment, operating room, device-assembly room, and/or the like. The main space 104 is defined by walls 106, a floor 116, and the ceiling 100. The walls 106 may include exhaust vents 108 that lead into a plenum 108 that extends from behind the walls 106 and over the ceiling 100. An air delivery device 110 may be positioned within the plenum 108, such as over the ceiling 100, or behind a wall 106. The plenum 108 may include modular units configured to secure to the ceiling 100, such as described in U.S. Patent Application Publication No. 2011/0097986, entitled "Ceiling System With Integrated Equipment System Structure," which is hereby incorporated by reference in its entirety.

The air delivery device 110 moves unfiltered air 112 from the plenum 108 into the internal chamber 91 of the assembly 10 and through the air filters 40, 41, and 43 (air filter 43 not shown in FIG. 4). Filtered air 113 is discharged through the air filters 40, 41, and 43 in multiple directions. For example, filtered air 113 discharged through the bottom surface 14 is vertically directed toward a floor 116 of the room 102, while filtered air 113 discharged through the end surfaces 18 is laterally directed toward the walls 106. Equipment 114, such as mechanical and/or electrical assemblies, may be secured to the ceiling 100 and/or the walls 106. The assembly 10 may discharge filtered air directly to the equipment 114, as well as toward the floor 116.

Once the air is discharged into the main space 104, the air delivery device 110 circulates the air 112 back into the plenum 108. The air 112 is then passed into the assembly 10 for filtering, as explained above.

The air-regulating devices 70 of each air filter 40, 41, and 43 may be selectively opened and closed in order to selectively allow air to pass through a particular filter 40, 41, and 43. For example, if all filtered air is to be directed toward the floor 116, the air-regulating devices 70 of the air filters 41 and 43 may be closed so that air is not discharged through the air filters 41 and 43. Similarly, if all filtered air to be directed toward the walls 106, the air-regulating devices 70 of the air filters 40 may be closed. The air-regulating devices 70 may be positioned between fully-closed and fully-opened positions in order to modulate airflow therethrough. The air-regulating devices 70 may be operated so that filtered air may be discharged through less than all of the surfaces of the assembly 10. For example, the air-regulating device 70 on one end surface 18 or one lateral surface 16 (shown in FIG. 1) may be closed, while the remaining air regulating devices 70 are opened.

Figure 5:
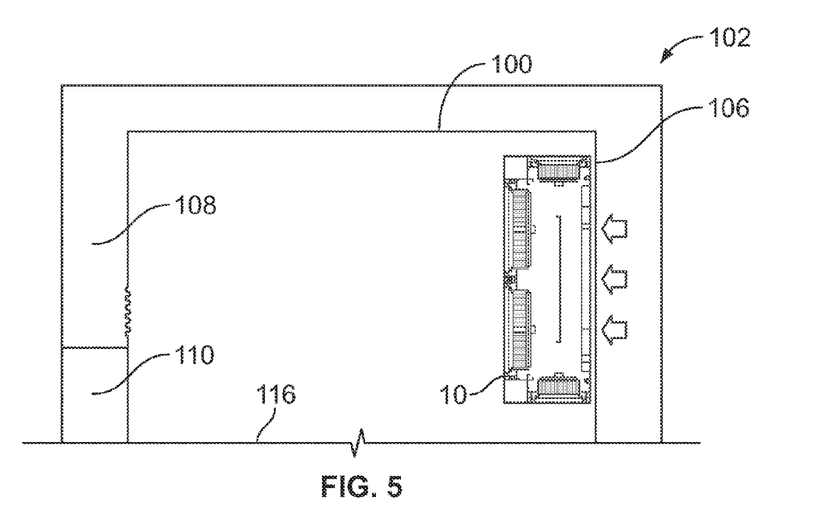
FIG. 5 illustrates a simplified view of a multi-directional air filter assembly secured to a wall of a room, according to an embodiment of the present disclosure.

FIG. 5 illustrates a simplified view of the multi-directional air filter assembly 10 secured to the wall 106 of the room 102, according to an embodiment of the present disclosure. FIG. 5 illustrates a system of supplying filtered air to the room 102. The assembly 10 and the room 102 are not necessarily drawn to scale. Each of the assembly 10 and the room 102 may be smaller or larger than shown. Additionally, multiple assemblies 10 may be secured within the room 102. As shown, the air delivery device 110 may be positioned within the plenum 108 proximate to the floor 116

Referring to FIGS. 4 and 5, one or more assemblies 10 may be secured to the ceiling 100 and/or one or both walls 106. Moreover, instead of being in fluid communication with the plenum 108, the assemblies 10 may be in fluid communication with outside air. For example, instead of a recirculating system, the assemblies 10 may be configured to filter ambient air that is then discharged out of the room 102 back to the environment.

Figure 6:
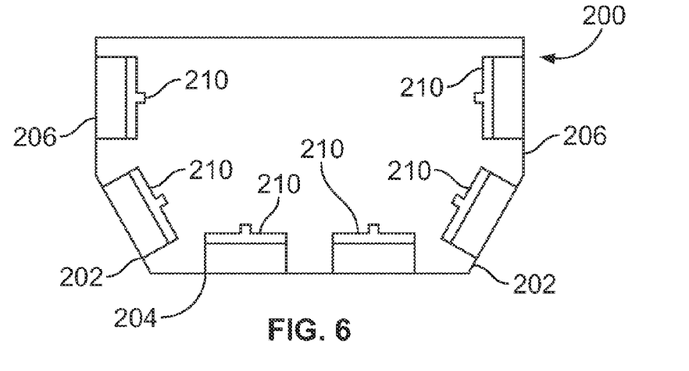
FIG. 6 illustrates an internal cross-sectional view of a multi-directional air filter assembly, according to an embodiment of the present disclosure.

FIG. 6 illustrates an internal cross-sectional view of a multi-directional air filter assembly 200, according to an embodiment of the present disclosure. The assembly 200 is similar to the assembly 10, except that the assembly 200 includes angled surfaces 202 that connect bottom and end surfaces 204 and 206, respectively. Air filters 210 may be supported on each surface 202, 204, and 206. As such, the air filters 210 are configured to provide discharged filtered air in additional directions than those aligned with x-, y-, and z-directions.

Figure 7:
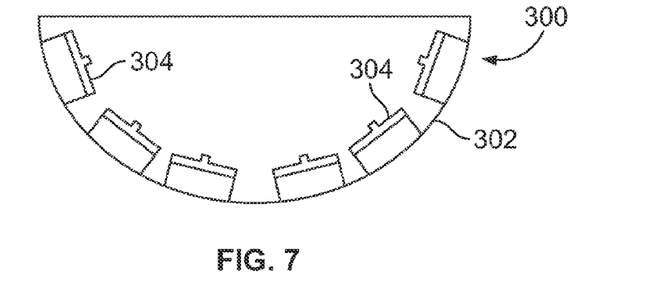
FIG. 7 illustrates an internal cross-sectional view of a multi-directional air filter assembly, according to an embodiment of the present disclosure.

FIG. 7 illustrates an internal cross-sectional view of a multi-directional air filter assembly 300, according to an embodiment of the present disclosure. The assembly 300 is similar to the assemblies 10 and 200, except that the assembly 300 includes a main housing 302 that may be dome-shaped. The main housing 302 supports multiple air filters 304 configured to discharge filtered air semi-spherically outward from the dome-shaped surface of the main housing 302.

The main housing 302 may be various sizes and shapes. The main housing 302 is configured to support air filters 304 that are configured to discharge filtered air from the various surfaces of the main housing 302. Accordingly, the assembly 300 is configured to discharge filtered air in multiple directions.

Figure 8:
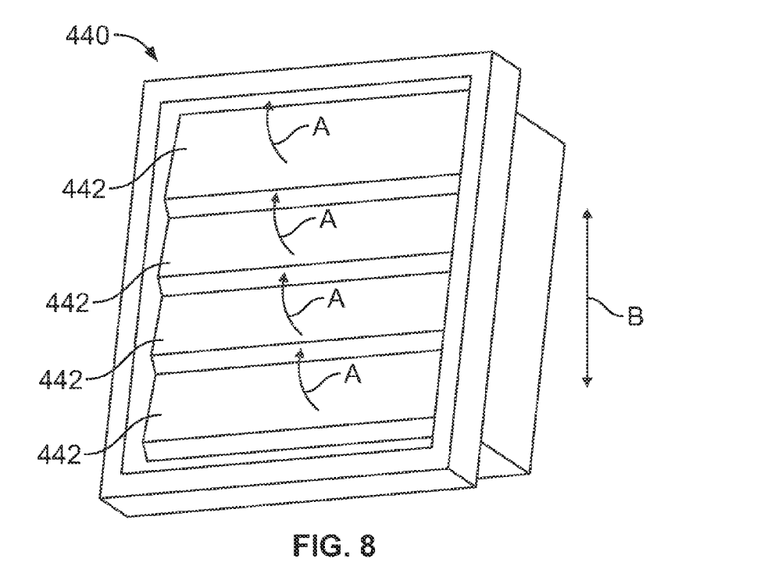
FIG. 8 illustrates an isometric view of a damper, according to an embodiment of the present disclosure.

FIG. 8 illustrates an isometric view of a damper 440, according to an embodiment of the present disclosure. The damper 440 is an example of an air-regulating device 70, shown in FIG. 3, for example. The damper 440 may be mounted or otherwise secured over filter media of an air filter. The damper 440 may include a plurality of plates 442. Each plate 442 is positioned on a pivot (not shown) that allows the plates 442 to be moved between open and closed positions. As shown in FIG. 8, the plates 442 are in the fully-closed position. When the damper 440 is to be opened, the plates 442 swing open in the direction of arc A.

Alternatively, the damper 440 may include a single sliding plate that slides between open and closed positions in directions denoted by arrow B. Indeed, the damper 440 may take any form that allows selective movement between open and closed positions.

Figure 9:
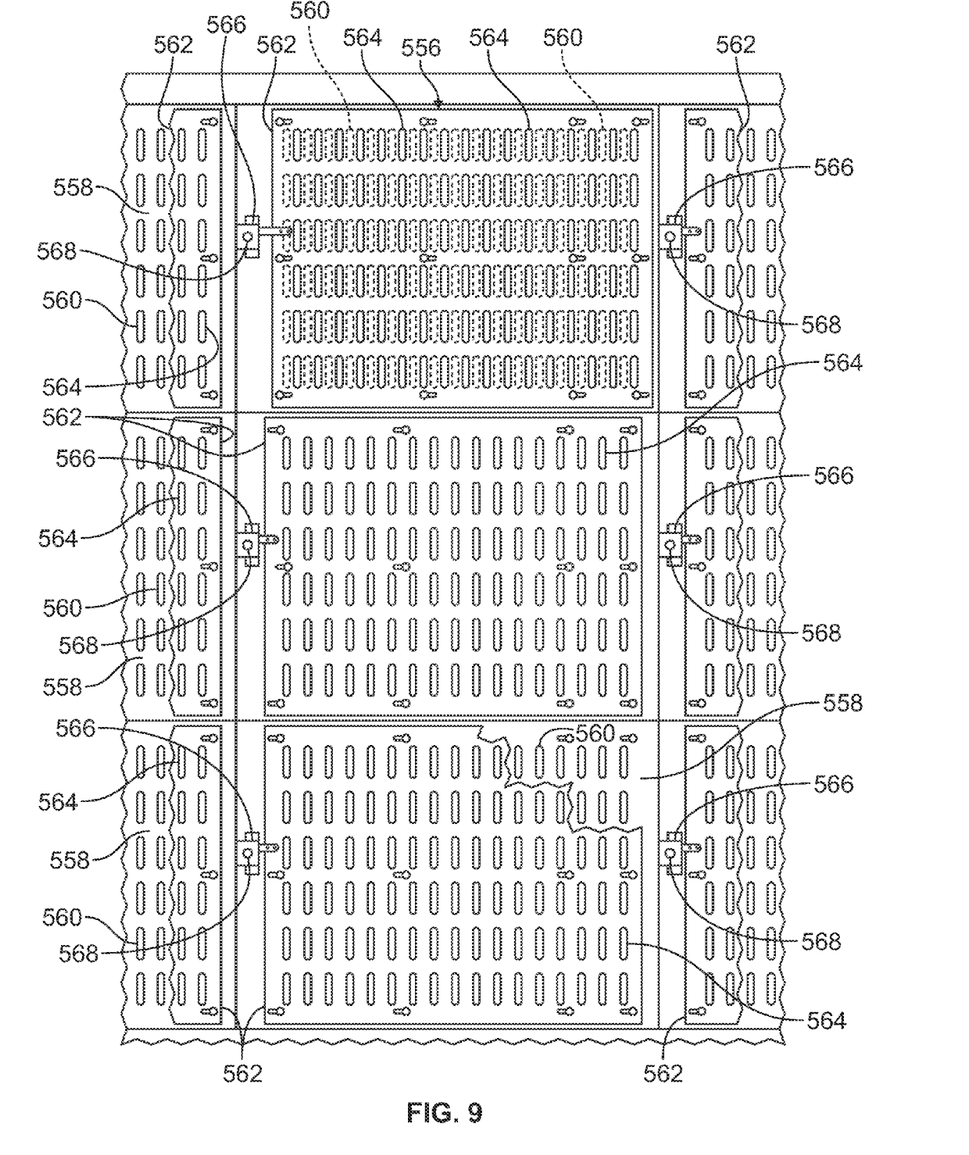
FIG. 9 illustrates a bottom view of an equalizer, according to an embodiment of the present disclosure.

FIG. 9 illustrates a bottom view of an equalizer 556, according to an embodiment of the present disclosure. The equalizer 556 is an example of an air-regulating device 70, shown in FIG. 3, for example. The equalizer 556 may be mounted or otherwise secured over filtering medium of an air filter. More or less equalizers 556 than shown in FIG. 9 may be secured to an air filter.

The equalizer 556 may be configured to regulate the amount of air that passes through different air filters (shown in FIGS. 1-7). The equalizers 556 may include first plates 558 configured to be attached to an air filter. The first plates 558 may include a series of elongated slots 560 extending therethrough. A second plate 562 may be slidably attached to each first plate 558. The second plate 562 may include a series of elongated slots 564, which may be sized and shaped similar to the slots 560. The second plate 562 is movable relative to the first plate 558 between an open position where the slots 560 and 564 are aligned with one another and a closed position where the slots 560 in the first plate 558 are completely covered by the second plate 562. The equalizer 556 may also include a ratchet mechanism 566 that allows each second plate 562 to be moved incrementally between its open and closed positions. A tool (not shown) may be inserted into a receptacle 568 in the ratchet mechanism 566 to adjust the second plate 562 to the desired location. Alternatively, the ratchet mechanism 566 may be automatically operated through an actuator assembly (not shown) that is operatively connected to a motor (not shown), which may, in turn, be operatively connected to a control system (not shown) configured to control operation of an air filter assembly, such as the assembly 10 shown in FIG. 1.

Figure 10:
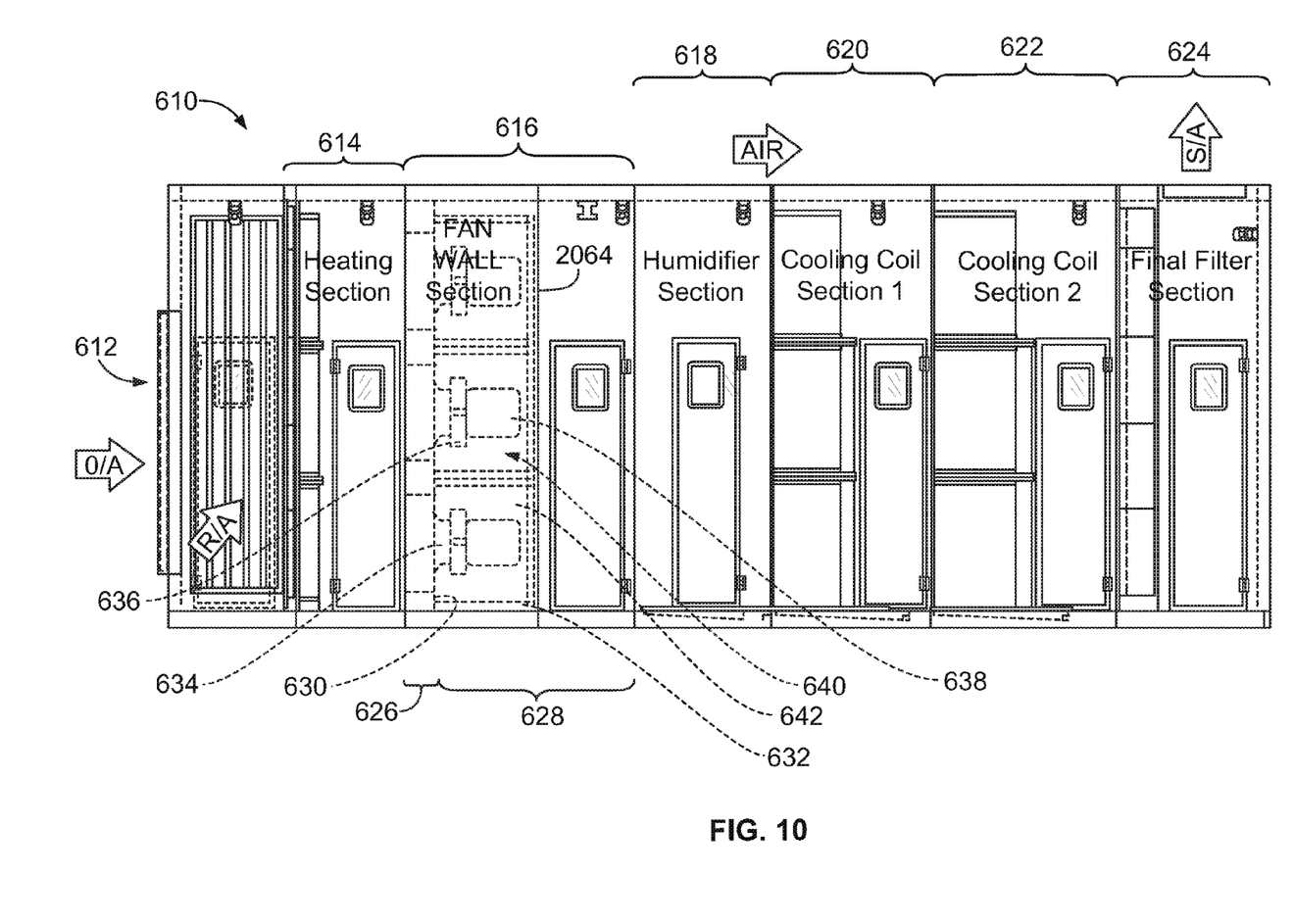
FIG. 10 illustrates a transverse interior view of an air handling system, according to an embodiment of the present disclosure.

FIG. 10 illustrates a transverse interior view of an air handler or air handling system 610, according to an embodiment of the present disclosure. The air handling system 610 is an example of an air delivery device 110 (shown in FIGS. 4 and 5). The air handling system 610 may be used with respect to an HVAC system used to condition air within a building. The system 610 is configured to condition air supplied to an enclosed room within a building and includes an inlet 612 that receives air. The system 610 may include a heating section 614 that heats the air and followed by an air handling section 616. A humidifier section 618 may be located downstream of the air handling section 616. Cooling coil sections 620 and 622 may be located downstream of the humidifier section 618 to cool the air. A filter section 624 may be located downstream of the cooling coil section 622 to filter the air. The sections may be reordered or removed. Additional sections may be included.

The air handling section 616 may include an inlet plenum 626 and a discharge plenum 628 that may be separated from one another by a bulkhead wall 630 that forms part of a frame 632. Fan inlet cones 634 may be located proximate to the bulkhead wall 630 of the frame 632. The fan inlet cones 634 may be mounted to the bulkhead wall 630. Alternatively, the frame 632 may support the fan inlet cones 634 in a suspended location proximate to, or separated from, the bulkhead wall 630. Fans 636 are mounted to drive shafts on individual corresponding motors 638. The motors 638 are secured to mounting blocks of the frame 632. Each fan 636 and the corresponding motor 638 form one of the individual fan units 640 that may be held in separate chambers 642. The chambers 642 are shown vertically stacked upon one another in a column. Optionally, more or fewer chambers 642 may be provided in each column. One or more columns of chambers 642 may be provided adjacent one another in a single air handling section 616.

Figure 11:
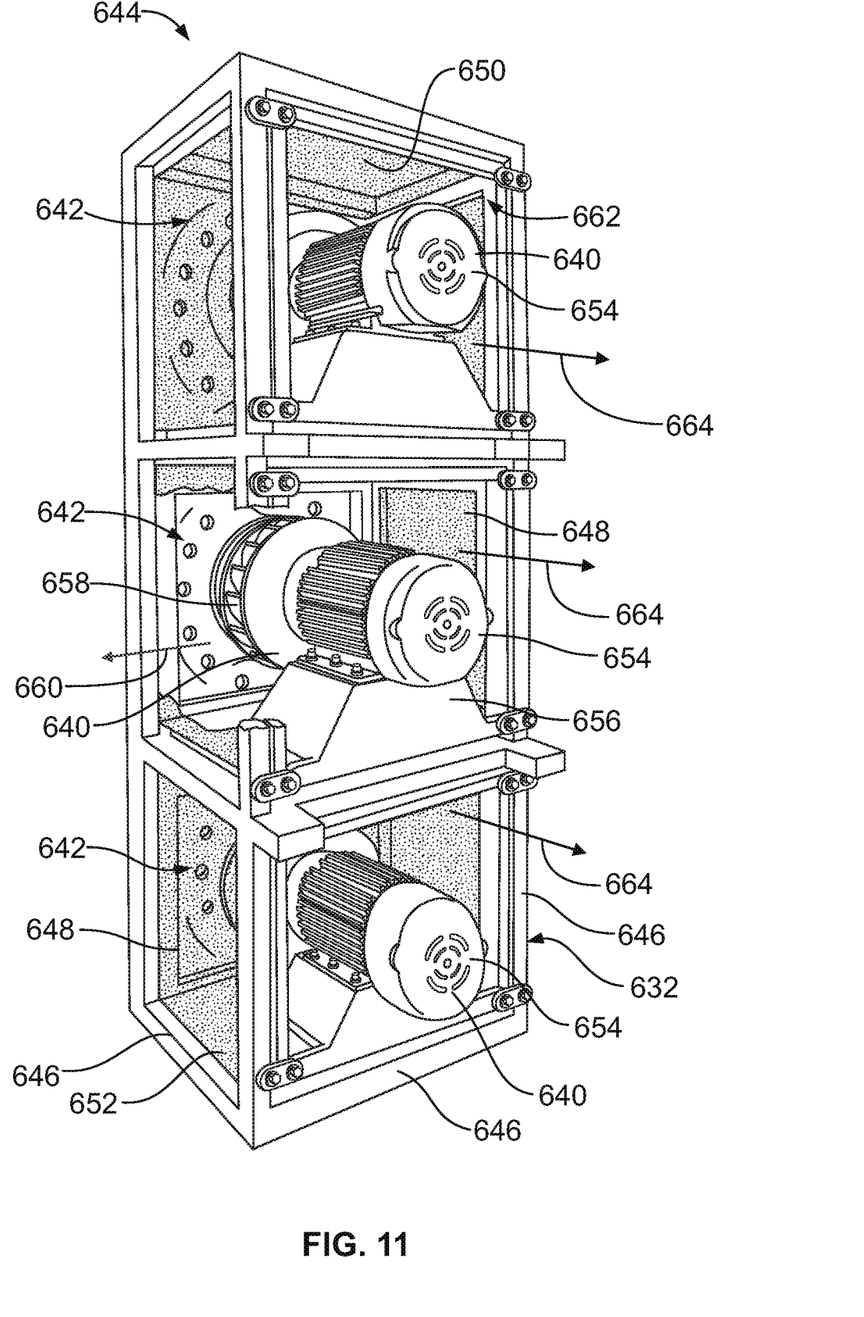
FIG. 11 illustrates a side perspective view of a column of chambers and corresponding fan units, according to an embodiment of the present disclosure.

FIG. 11 illustrates a side perspective view of a column 644 of chambers 642 and corresponding fan units 640, according to an embodiment of the present disclosure. The frame 632 may include edge beams 646 extending horizontally and vertically along the top, bottom and sides of each chamber 642. Side panels 648 may be provided on opposite sides of at least a portion of the fan unit 640. Top and bottom panels 650 and 652 are provided above and below at least a portion of the fan units 640. The top and bottom panels 650 and 652 may be provided above and below each fan unit 640. Alternatively, the panels 650 and 652 may be provided above only the uppermost fan unit 640, and/or only below the lowermost fan unit 640.

Motors 654 may be mounted on brackets 656 that are secured to the edge beams 646. Fans 658 may be open-sided plenum fans that draw air inward along the rotational axis of the fan and radially discharge the air about the rotational axis in the direction of arc 660. The air then flows from the discharge end 662 of each chamber 642 in the direction of arrows 664.

The motors 654 may be induction motors, or permanent magnet motors, for example. In particular, the motors 654 may be polyphase induction motors or permanent magnet motors. Power may be supplied to the fans 658 through the motors 654 by way of electromagnetic induction. In general, the speed of the motors 654 may be determined by a frequency of a supply current. The motors 654 may utilize variable frequency drives to vary the speed of the motors 654. Alternatively, various other types of motors may be used.

As shown in FIG. 11, three fans 658 are shown stacked vertically. However, the fan array may be various other configurations. For example, the three fans 658 may be oriented in a row, instead of a column. Optionally, the three fans 658 may be oriented in a triangular configuration.

Air handling systems and fan arrays are described and shown, for example, in U.S. Pat. No. 7,527,468, entitled "Fan Array Fan Section In Air-Handling Systems," U.S. Pat. No. 7,922,442, entitled "Fan Array Fan Section In Air Handling Systems," U.S. Pat. No. 7,914,252, entitled "Fan Array Fan Section In Air Handling Systems," U.S. Pat. No. 7,597,534, entitled "Fan Array Fan Section In Air Handling Systems," U.S. Pat. No. 8,087,877, entitled "Fan Array Fan Section In Air Handling Systems," U.S. Patent Application Publication No. 2011/0014061, entitled "Fan Array Control System," and U.S. Patent Application No. 2011/0255704, entitled "Methods and Systems for Active Sound Attenuation In An Air Handling Unit," all of which are hereby incorporated by reference in their entireties. Embodiments of the present disclosure may be used with various air handling or processing systems.

While described with respect to air handling systems, embodiments of the present disclosure may be used with respect to various other systems and methods of conditioning air supplied to an enclosed structure. That is, embodiments of the present disclosure are not limited to use with air handling systems.

Embodiments of the present disclosure provide an air filter assembly configured to discharge air in multiple directions. For example, the air filter assembly may discharge filtered air downwardly toward a floor of a room, and toward walls and/or a ceiling of the room. Equipment and/or tracks may be positioned at the same level as the air filter assembly and directly receive filtered air from the assembly.

Certain embodiments of the present disclosure provide a method of supplying filtered air to a room. The method may include moving air into an air filter assembly positioned within a room, filtering a first portion of the air with one or more first air filters proximate to a first surface of the filter assembly, filtering a second portion of the air with one or more second air filters proximate to a second surface of the air filter assembly that differs from the first surface, and discharging filtered air through the first and second surfaces of the air filter assembly into the room.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An air filter assembly configured to deliver filtered air to a room, the air filter assembly comprising:
   a main housing configured for connection to a plenum and having at least first and second surfaces that define an interior of the main housing, wherein the first surface differs from the second surface;
   one or more first air filters proximate to the first surface, wherein the one or more first air filters is configured to discharge a first portion of filtered air through the first surface in a first direction to discharge the air from the interior of the main housing; and
   one or more second air filters proximate to the second surface, wherein the one or more second air filters is configured to discharge a second portion of filtered air through the second surface in a second direction that differs from the first direction to discharge the air from the interior of the main housing,
   wherein each of the one or more first air filters and the one or more second air filters comprises:
   a filtering medium configured to filter contaminants from the air; and
   an air-regulating device secured to the filtering medium, wherein the air-regulating device is configured to be selectively opened and closed.

2. The air filter assembly of claim 1, wherein the first surface comprises a bottom surface, and the second surface comprises one or both of one or more lateral surfaces or one or more end surfaces.

3. The air filter assembly of claim 1, further comprising:
   a third surface that differs from the first and second surfaces; and
   one or more third air filters proximate to the third surface, wherein the one or more third air filters is configured to discharge a third portion of filtered air through the third surface in a third direction that differs from the first and second directions.

4. The air filter assembly of claim 3, wherein the first surface comprises a bottom surface, the second surface comprises one or more lateral surfaces, and the third surface comprises one or more end surfaces.

5. The air filter assembly of claim 1, wherein the first surface is orthogonal to the second surface.

6. The air filter assembly of claim 1, wherein the main housing is dome-shaped.

7. The air filter assembly of claim 1, wherein the air-regulating device comprises one or more of a damper or an equalizer.

8. The air filter assembly of claim 1, wherein the main housing is configured to be secured underneath a ceiling of the room.

9. The air filter assembly of claim 1, wherein the main housing is configured to be secured to a wall of the room.

10. A system for supplying filtered air to a room, the system comprising:
    a plenum positioned about at least a portion of the room;
    an air filter assembly in fluid communication with the plenum, the air filter assembly configured to receive and filter air from the plenum and deliver filtered air to the room, the air filter assembly comprising:
    a main housing having at east first and second surfaces, wherein the first surface differs from the second surface;
    one or more first air filters proximate to the first surface, wherein the one or more first air filters is configured to discharge a first portion of filtered air through the first surface in a first direction; and
    one or more second air filters proximate to the second surface, wherein the one or more second air filters is configured to discharge a second portion of filtered air through the second surface in a second direction that differs from the first direction,
    wherein each of the one or more first air filters and the one or more second air filters comprises:
    a filtering medium configured to filter contaminants from the air; and an air-regulating device secured to the filtering medium, wherein the air-regulating device is configured to be selectively opened and closed.

11. The system of claim 10, further comprising an air delivery device positioned within the plenum, wherein the air delivery device is configured to move the air through the air filter assembly.

12. The system of claim 10, wherein the air delivery device comprises an air handler.

13. The system of claim 10, wherein the first surface comprises a bottom surface, and the second surface comprises one or both of one or more lateral surfaces or one or more end surfaces.

14. The system of claim 10, further comprising:
a third surface that differs from the first and second surfaces; and
one or more third air filters proximate to the third surface, wherein the one or more third air filters is configured to discharge a third portion of filtered air through the third surface in a third direction that differs from the first and second directions.

15. The system of claim 14, wherein the first surface comprises a bottom surface, the second surface comprises one or more lateral surfaces, and the third surface comprises one or more end surfaces.

16. The system of claim 10, wherein the first surface is orthogonal to the second surface.

17. The system of claim 10, wherein the main housing is dome-shaped.

18. The system of claim 10, wherein the air-regulating device comprises one or more of a damper or an equalizer.

19. The system of claim 10, wherein the main housing is secured underneath a ceiling of the room.

20. The system of claim 10, wherein the main housing is secured to a wall of the room.

* * * * *

UNITED STATES PATENT AND TRADEMARK OFFICE
CERTIFICATE OF CORRECTION

Page 1 of 1

PATENT NO. : 9,631,825 B2
APPLICATION NO. : 13/717826
DATED : April 25, 2017
INVENTOR(S) : Zareer Cursetjee It is certified that error appears in the above-identified patent and that said Letters Patent is hereby corrected as shown below:

In the Claims

In Column 10, Line 52, in Claim 10, delete "east" and insert --least-- therefor

Signed and Sealed this
Fourth Day of June, 2019

Andrei Iancu
*Director of the United States Patent and Trademark Office*